US006527060B1

(12) United States Patent
Schoeps

(10) Patent No.: US 6,527,060 B1
(45) Date of Patent: Mar. 4, 2003

(54) PORTABLE POWER TOOL WITH SEPARATE PISTOL-TYPE HANDLE

(75) Inventor: Knut Christian Schoeps, Tyresö (SE)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 09/601,207

(22) PCT Filed: Jan. 26, 1999

(86) PCT No.: PCT/SE99/00100

§ 371 (c)(1),
(2), (4) Date: Oct. 2, 2000

(87) PCT Pub. No.: WO99/39877

PCT Pub. Date: Aug. 12, 1999

(30) Foreign Application Priority Data

Feb. 3, 1998 (SE) .............................................. 9800307
Apr. 1, 1998 (SE) .............................................. 9801156

(51) Int. Cl.$^7$ ................................................ B23B 45/04
(52) U.S. Cl. ....................... 173/93.5; 173/169; 173/170
(58) Field of Search ........................ 173/93, 93.5, 93.6, 173/168, 169, 170, 171, 104

(56) References Cited

U.S. PATENT DOCUMENTS 3,179,219 A 4/1965 Karden
3,236,157 A * 2/1966 Lovell et al. ............... 173/169
4,236,589 A * 12/1980 Griffith ....................... 173/169
4,976,175 A 12/1990 Hung
5,044,568 A * 9/1991 Shigemizu .................. 173/170
5,372,420 A 12/1994 Van Deursen et al.
5,377,769 A * 1/1995 Hasuo et al. ............... 173/169
5,466,183 A * 11/1995 Kirn et al. .................. 173/170
5,687,802 A * 11/1997 Spooner et al. ............ 173/170
5,974,611 A * 11/1999 Casella ....................... 173/169

FOREIGN PATENT DOCUMENTS

EP 0 280 527 8/1988

* cited by examiner

*Primary Examiner*—Scott A. Smith

(57) ABSTRACT

A portable power tool having a housing with a pneumatic motor, an output shaft extending in a longitudinal direction of the housing and connected to the motor, and a pistol type handle which a power supply for connecting the motor to a power source and which is fixable relative to the housing in alternate longitudinal positions. The housing is provided with an outer cylindrical surface with a geometric axis extending in the longitudinal direction of the housing, and the handle comprises a tubular portion with an inner cylindrical surface for guiding support of the housing surface. Locking elements are provided for arresting the handle relative to the housing in any desired position, and interacting air communicating passages are provided in the contact surfaces of the housing and the handle for conducting air to and from the motor irrespective of the actual longitudinal position of the handle relative to the housing.

10 Claims, 7 Drawing Sheets

PORTABLE POWER TOOL WITH SEPARATE PISTOL-TYPE HANDLE

BACKGROUND OF THE INVENTION

This invention relates to a portable power tool of the type having a housing, a motor, an output shaft connected to the motor and extending out of the housing in a longitudinal direction thereof, and a pistol type handle which includes a power supply means for connecting the motor to a power source.

Most prior art power tools of this type have its housing and handle formed as an integrated unit, mostly manufactured as a light alloy casting. This one-piece design is rather complicated and the manufacturing costs are difficult to bring down.

Prior art includes power tools having separate handles secured to the tool housing by screw joints, see for instance U.S. Pat. No. 3,179,219. Such bolted-on handles are disadvantageous both in that the grip portion of the handle is located at a greater distance from the output shaft axis and, thereby, causes a heavier moment on the operators hand, and in that widened upper portion of the handle including the attachment screws for the handle makes the handle itself and the handling of the tool less comfortable.

SUMMARY OF THE INVENTION

A primary object of the invention is to provide an improved portable power tool of the above type, wherein the housing and handle designs are very simple and compact and provide a certain flexibility as regards the handle-to-housing interengagement, and wherein the handle is fixed to the housing without any screw joints impairing the handling of the tool and with the grip portion as close as possible to the output shaft axis.

Another object of the invention is to provide a pistol-type power tool wherein the handle in a simple way is fixable to the tool housing in one specific or in two or more alternative positions.

A further object of the invention is to provide a power tool of the type wherein the handle is arranged to be longitudinally adjustable and fixable to the housing in anyone of a number of alternative positions. This is a desirable feature of the tool to compensate for the weight of different types and sizes of working implements attached to the output shaft. This is the case, for instance in power wrenches on which nut sockets of different sizes may be attached to the output shaft, with or without extensions. The different sizes and weights of the implements attached to the output shaft influence the location of the centre of gravity of the tool as a whole, such that a heavy implement causes a more forwardly located centre of gravity, whereas a light implement causes a more rearwardly located centre of gravity. This, of course, influences the balance of the tool and causes in some cases an uncomfortable and even unsafe handling of the tool.

A previously suggested solution to this problem means that a pistol handle of a bolted-on type is adjustable in the longitudinal direction of the tool housing by being fixable to the tool housing in anyone of a number of alternative fixed positions determined by a number of alternative sets of holes for the handle mounting screws.

A drawback inherent in previously known power tools having separate handles mounted as described above resides in the fact that they have flat contact surfaces between the handle and the housing and that these parts are secured to each other by a number mounting screws. This way of securing the handle to the housing requires extra space and results in a further offset location of the handle in relation to the housing, which means that the moment caused by the tool application force times the distance between the output shaft centre line and the handle becomes unnecessary large.

So, one object of the invention is to provide an improved pistol type power tool by which the handle is adjustable for improved balance of the tool without adding any space demanding mounting means for the handle which would cause an undesirable lateral displacement of the handle and a subsequent increased reaction moment to be handled by the operator.

Further objects and advantages of the invention will appear from the following specification and claims.

A preferred embodiment of the invention is below described in detail with reference to the accompanying drawings. On the drawings

DETAILED DESCRIPTION OF THE PREFERRED EMBODIMENTS

Figure 1:
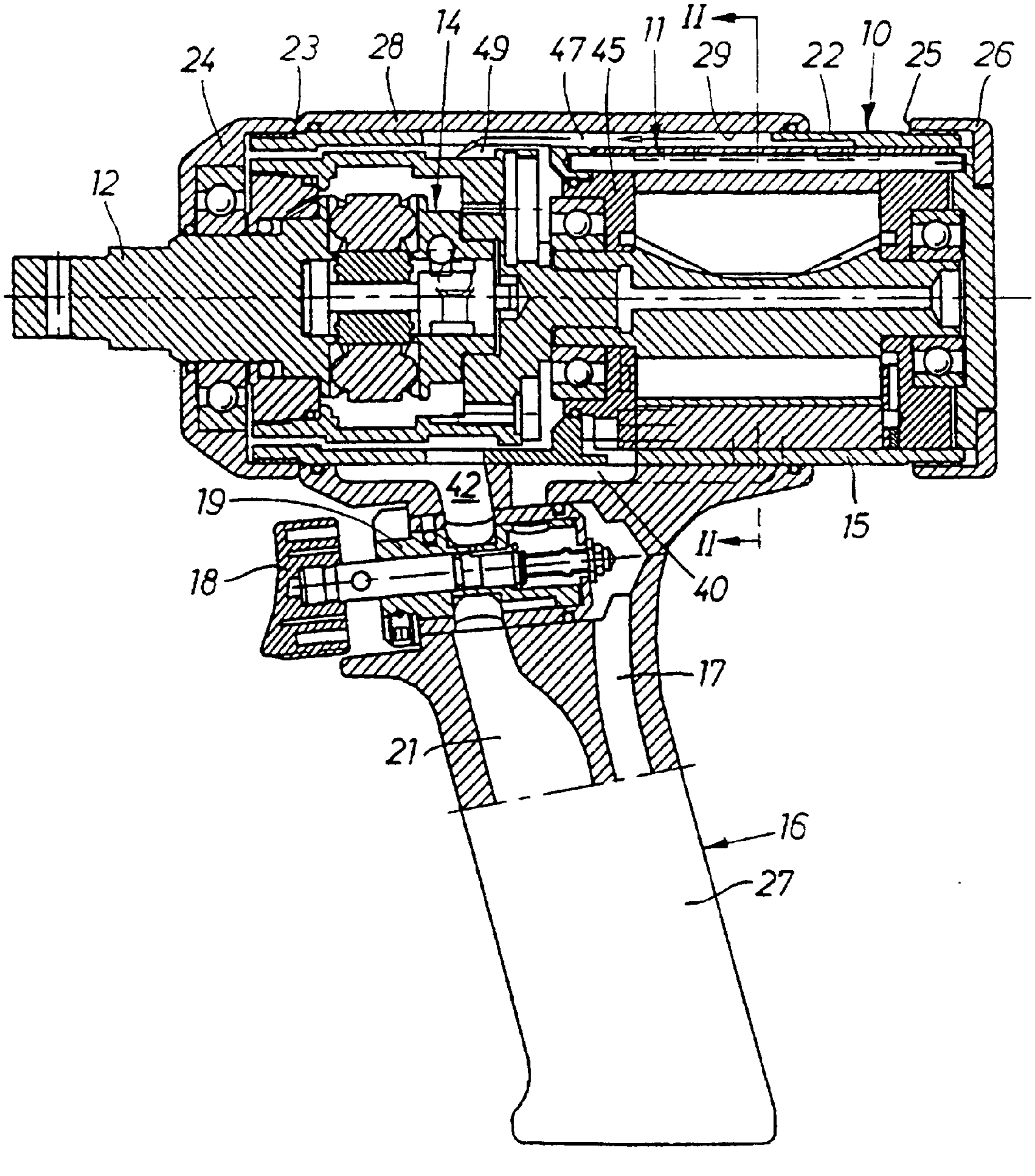
FIG. 1 shows, partly in section, a side view of a pneumatic power nutrunner according to the invention.

The nutrunner examples shown in the drawing figures are particularly adapted to meet the requirement for a handle that is adjustable in the longitudinal direction of the tool housing. The nutrunner comprises a housing 10, a pneumatic motor 11 located in the housing 10 and driving an output shaft 12 via a hydraulic impulse unit 14, and a pistol type handle 16 attached to the housing 10. The housing 10 comprises a substantially tubular body 15 surrounding both the motor 11 and the impulse unit 14. The handle 16 comprises an air inlet passage 17, a seat type air inlet valve 18, and a rotatable directional valve 19 for changing the direction of rotation of the motor 11. The handle 16 also includes an air exhaust passage 21 for leading exhaust air away from the housing 10 out through the handle 16.

The inlet valve 18 and the directional valve 19 are of a design commonly used in this type of tools and are, therefore, not described in further detail.

As mentioned above, the motor 11 is a twin-chamber motor of a well known type, and the impulse unit 14 shown in FIG. 1 is of the radial piston type previously described in for instance U.S. Pat. No. 5,092,410. These parts of the power tool do not per se form any part of the invention, and a detailed description thereof is not included in this specification.

The tubular housing body 15 has an outer cylindrical surface 22 which extends in the longitudinal direction of the housing 10 between a first annular shoulder 23 formed by a front end wall 24 and a second annular shoulder 25 formed by a rear end closure 26 of the housing 10.

The handle 16 comprises a lower grip portion 27 and an upper tubular portion 28. The latter is formed with an inner cylindrical surface 29 having a geometric axis extending substantially perpendicularly to the grip portion 27 and being arranged to fit snugly around the cylindrical housing surface 22. In this particular example, the tubular portion 28 has an axial extent that is shorter than the cylindrical surface 22 which means that the handle 16 may be adjusted and located in alternative positions in the longitudinal direction of the housing 10.

Figure 5:
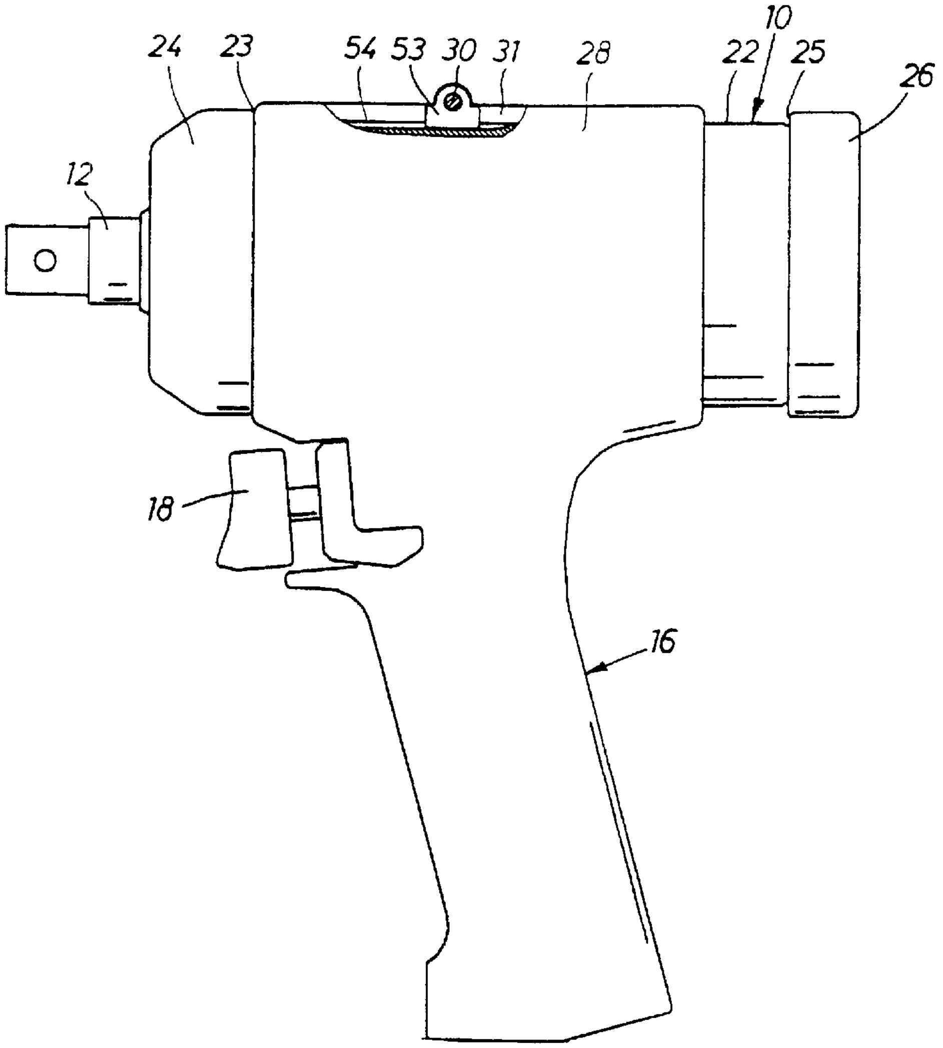
FIG. 5 shows a side view, partly in section, of the nutrunner illustrating the lock means for arresting the handle.
Figure 6:
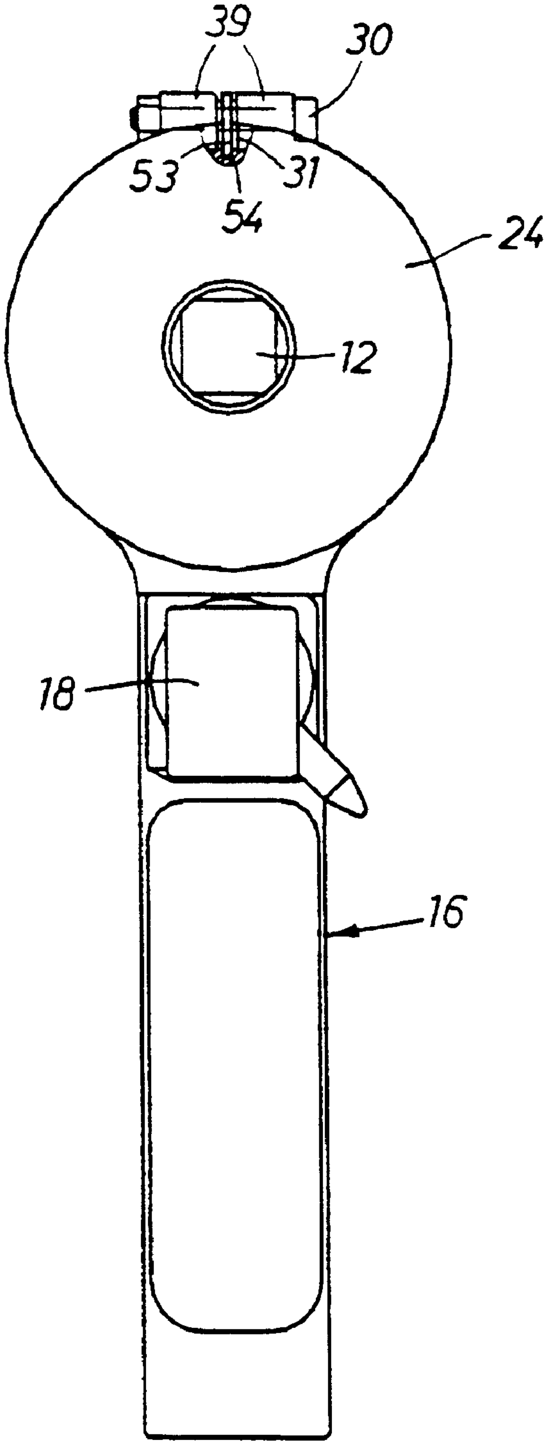
FIG. 6 shows a front end view of the nutrunner, illustrating the longitudinal slot throughout the tubular handle portion and the transverse clamp screw.

As illustrated in FIGS. 5 and 6, the tubular portion 28 comprises a slot 31 extending axially throughout the entire length of the tubular portion 28, thereby making the tubular portion 28 elastically expandable and compressible. A clamp screw 30 extends across the slot 31 and engages one ear 39 on each side of the slot 31 and is arranged to exert a clamping force on the tubular portion 28. By loosen and tightening the clamp screw 30, the handle 16 may be displaced relative to the housing 10 and arrested in any longitudinal position within the axial limits defined by the annular shoulders 23 and 25.

The correct angular position of the tubular portion 28 relative to the housing 10 is maintained during longitudinal adjustment of the handle 16 by a wedge element 53 supported on the clamp screw 30 and guidingly engaging an axial groove 54 on the cylindrical surface 22. The wedge element 53 is thin enough not to hinder compression of the tubular portion 28 when tightening the clamping screw 30.

In order to ensure a maintained communication between the air inlet and outlet passages 17 and 21, respectively, in the handle 16 on one hand and the motor 11 in the housing 10 on the other hand, irrespective of the actual longitudinal position of the handle 16 relative to the housing 10, there are provided a number of openings in the handle 16 arranged to register with passages in the housing 10.

Figure 2:
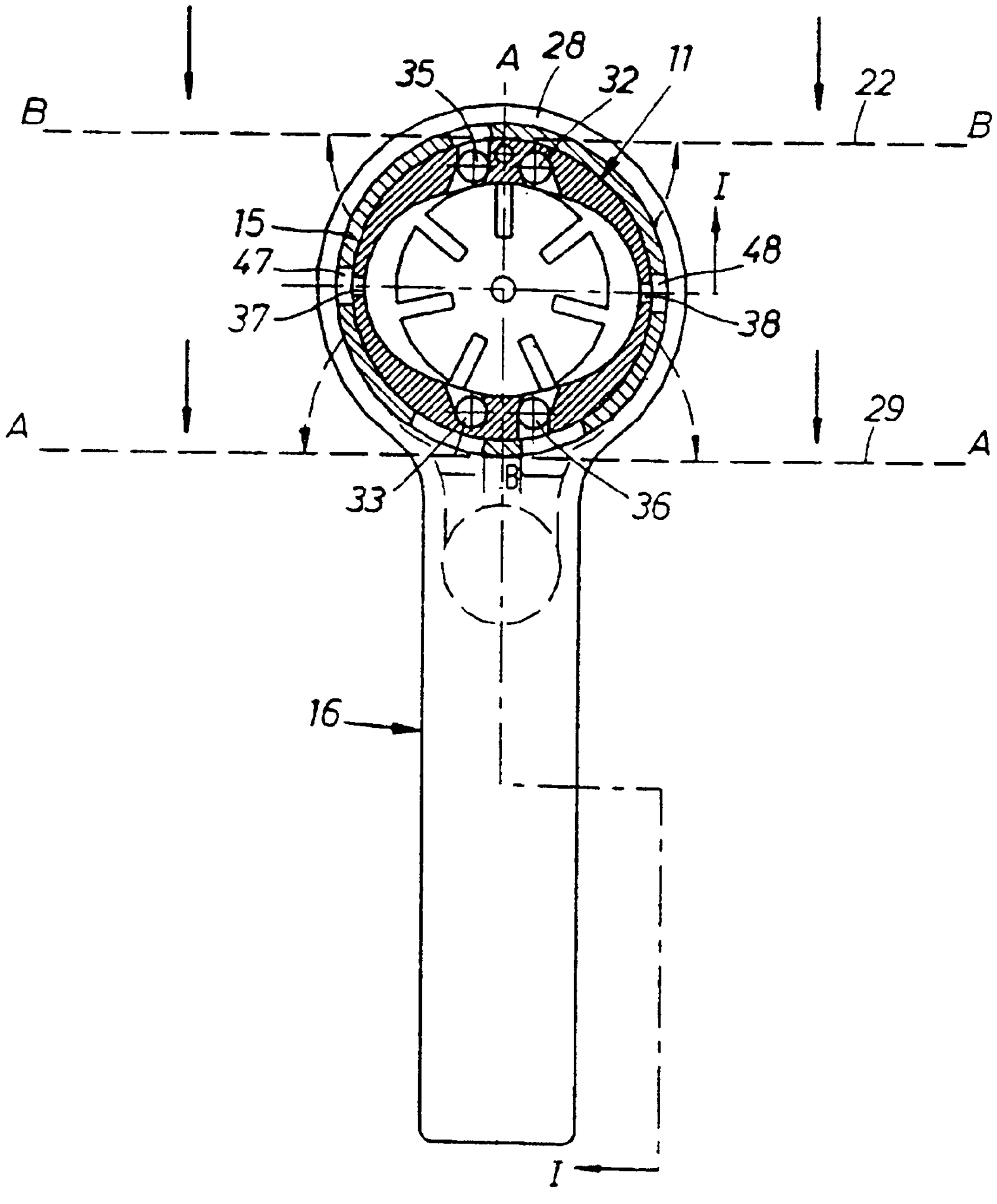
FIG. 2 shows, partly in section, a rear end view of the nutrunner in FIG. 1, including straight dash lines and curved arrows illustrating how the cylindrical surfaces of the housing and the handle are spread out to flattened forms.

As illustrated in FIG. 2, the twin chamber motor 11 has two sets of air communication ports, namely two inlet ports 32,33 for rotation in one direction, two inlet ports 35,36 for rotation in the opposite direction, and two outlet ports 37,38. When the motor is rotating in one direction, pressure air is fed into the motor 11 via the ports 32,33 whereas the other two openings 35,36 act as secondary outlet openings. At rotation in the opposite direction, the ports 35,36 will act as air feed openings, whereas the ports 32,33 will act as secondary outlet openings.

These air communication ports 32,33,35,36 and outlet ports 37,38 communicate with the outer cylindrical surface 22 of the housing 10 via circumferentially and axially extending grooves and apertures which will be described in further detail below.

Figure 3:
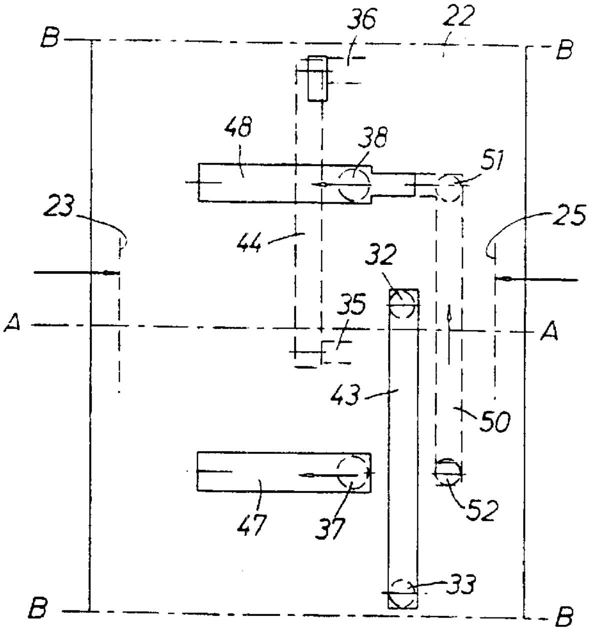
FIG. 3 shows, in a flattened form, the outer cylindrical surface of the nutrunner housing including the air passages communicating with the motor.

For illustrating purposes, the cylindrical outer surface 22 of the housing 10 is shown in FIG. 3 in a flattened form, and for facilitating understanding of the port and opening pattern on the surface 22, the top position A and the bottom position B of the housing 10 are marked both in FIGS. 2 and 3. The same goes for FIG. 4 which illustrates the inner cylindrical surface 29 of the handle portion 28 in a flattened form. The way of projecting the cylindrical surfaces 22,29 in flattened forms is illustrated by the curved arrows in FIG. 2.

Figure 4:
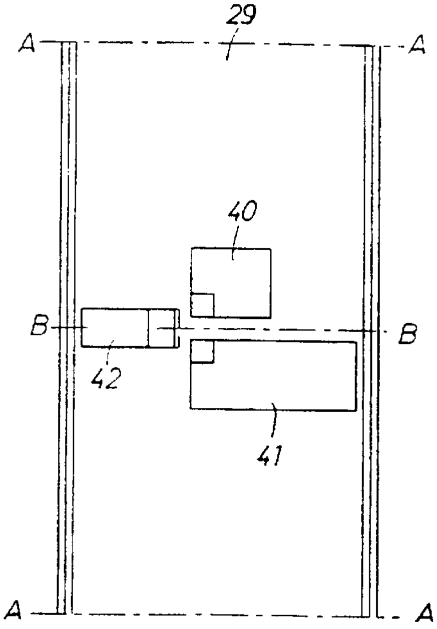
FIG. 4 shows, in a flattened form, the inner cylindrical surface of the tubular handle portion, including the air passages communicating with the air supply and exhaust means in the handle.

As illustrated in FIG. 4, the inner surface 29 of the handle portion 28 has two air communicating openings 40,41 and one outlet opening 42. The latter communicates directly with the outlet passage 21 in the handle 16, whereas the openings 40,41 are alternatively connectable to the air inlet passage 17 or the outlet passage 21 via the reverse valve 19. See FIG. 1.

In FIG. 3, there are illustrated various slots and grooves in the cylindrical surface 22 of the housing body 15 for distributing air to and from the motor ports. There is a circumferentially extending slot 43 which is intended to communicate with opening 41 in the handle surface 29 and to interconnect the two air communicating ports 32,33. The ports 32,33 are angularly spaced by 180° for feeding pressure air to both working chambers of the motor 11. At right hand rotation of the motor 11, the slot 43 and the ports 32,33 are supplied with pressure air via the inlet valve 18 and the opening 41, whereas at reverse, left hand rotation of the motor 11, the slot 43 is connected to the exhaust passage 21.

A groove 44 formed partly on the inside of the tubular body 15 and partly in forward motor end wall and illustrated in dash lines in FIG. 3, is arranged to interconnect the two other air communication openings 35,36. The latters are axially directed into the forward motor end wall and are illustrated schematically in dash lines in FIG. 3. The groove 44 is arranged also to communicate with the opening 40 in the handle surface 29 so as to feed pressure air to the opposite motor chambers at reverse, left hand rotation of the motor 11. At right hand rotation of the motor 11, the groove 44 and the openings 35,36 are connected to the exhaust passage 21.

The two outlet ports 37,38 communicate with two axially directed slots 47,48 which are arranged to lead exhaust air past the forward end of the motor 11 and into a housing space 49. This space 29 surrounds the impulse unit 14 and communicates with the exhaust opening 42 in the handle surface 29. See FIG. 1.

In FIG. 3, there is illustrated in dash lines a semi circumferential groove 50 located on the inside of the housing body 15 and interconnecting two more outlet openings 51,52 in the motor 11. The groove 50 communicates with the housing space 49 and the exhaust passage 21 via the slot 48. As illustrated in FIG. 4, the air communication openings 40,41 have a certain axial extent by which a proper communication is ensured between the handle 16 and the motor 11, irrespective of the actual longitudinal position of the handle 16 in relation to the housing 10.

Figure 7:
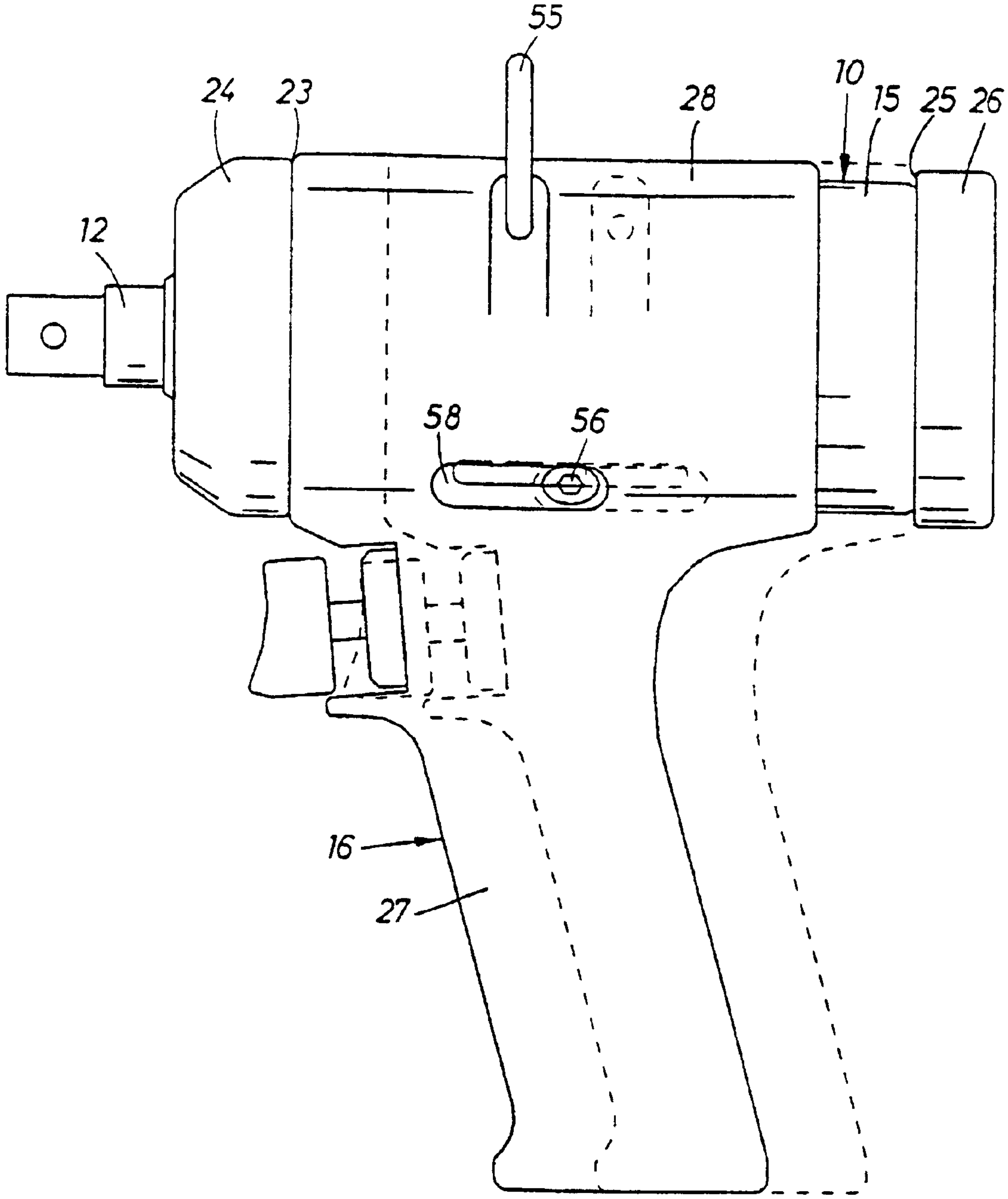
FIG. 7 shows a side view of a nutrunner according to an alternative embodiment of the invention, illustrating in phantom lines one extreme position of the handle.
Figure 8:
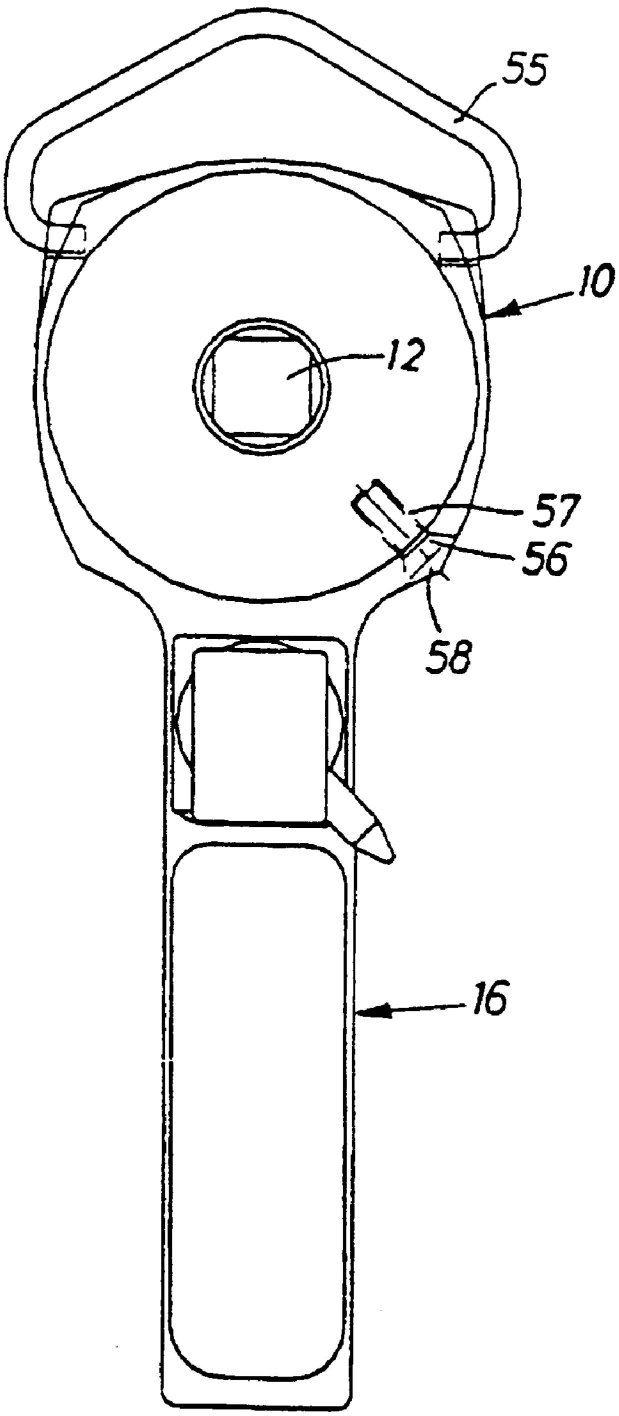
FIG. 8 shows a front end view of the nutrunner in FIG. 7, illustrating the handle lock means.

In FIGS. 7 and 8, there is shown a nutrunner according to an alternative embodiment of the invention in which the handle lock means comprises a lateral slot 58 extending in the longitudinal direction of the housing 10, and a lock screw 56 extending through the slot 58 and engaging a threaded bore 57 in the housing 10.

In this nutrunner, which is illustrated with a suspension yoke 55 for connection to an over head tool support device (not shown), the handle position relative to the housing 10 may be changed by loosening the lock screw 56, displacing the handle 16 along the tubular body 15, and retightening the screw 56 as the desired position of the handle 16 is obtained.

It should be noted that the embodiments of the invention are not limited to the above described examples but may be varied within the scope of the claims. One additional feature obtainable by having the handle supported on the tool housing via a cylindrical surface is that the handle may be positioned in alternative angular positions relative to the housing. This could be used for accomplishing a motor reverse function. By arranging the fluid communication openings in the tubular handle portion 28 and on the cylindrical surface 22 in a certain pattern, it would be possible to obtain "forward" and "reverse" operations, respectively, of the motor by turning the handle between two alternative angular positions.

What is claimed is:

1. A portalbe power tool comprising:

a housing comprising an outer cylindrical surface having a geometric axis extending substantially in a longitudinal direction of said housing, a motor located in said housing, an output shaft extending in the longitudinal direction of said housing and being connected to said motor, and a handle comprising a grip portion and a tubular portion having a geometric axis extending substantially transversely to said grip portion, said handle containing power supply means for connecting said motor to a power source, wherein said tubular portion of said handle surrounds and is supported on said cylindrical surface of said housing, wherein a lock means is provided for arresting said handle relative to said housing, wherein said cylindrical surface of said housing and said tubular portion of said handle are provided with interacting power transferring means for transferring power from said power supply means in said handle to said housing, and wherein said lock means comprises a longitudinal slot extending throughout an entire length of said tubular portion of said handle so as to make said tubular portion elastically expandable and compressible, and at least one clamping member extending across said slot and arranged to exert a compressing force on said tubular portion to thereby clamp said tubular portion firmly to said cylindrical surface of said housing and lock said handle relative to said housing.

2. The portable power tool according to claim 1, wherein said clamping member comprises a screw extending through two ears respectively located on each side of said slot.

3. The power tool according to claim 1, wherein said cylindrical surface of said housing and said tubular portion of said handle have circular cross sections.

4. The power tool according to claim 3, wherein said cylindrical surface of said housing is provided with an axial groove, and a wedge element supported on said tubular portion of said handle engages said groove for maintaining relative angular positions of said handle and said housing during longitudinal adjustment of said handle.

5. A portable power tool comprising:

a housing comprising an outer cylindrical surface having a geometric axis extending substantially in a longitudinal direction of said housing, a motor located in said housing, an output shaft extending in the longitudinal direction of said housing and being connected to said motor, and a handle comprising a grip portion and a tubular portion having a geometric axis extending substantially transversely to said grip portion, said handle containing power supply means for connecting said motor to a power source, wherein said tubular portion of said handle surrounds and is supported on said cylindrical surface of said housing, wherein a lock means is provided for arresting said handle relative to said housing, wherein said cylindrical surface of said housing and said tubular portion of said handle are provided with interacting power transferring means for transferring power from said power supply means in said handle to said housing, wherein a length of said cylindrical surface of said housing exceeds a length of said tubular portion of said handle, and said tubular portion is longitudinally displaceable relative to said cylindrical surface thereby making said handle adjustable relative to said housing in the longitudinal direction of said housing, and wherein said handle is arrestable in alternative longitudinal positions relative to said housing by operation of said lock means.

6. The power tool according to claim 5, wherein said cylindrical surface of said housing is axially defined by two opposite shoulders, and axial displacement of said handle is positively limited by said shoulders.

7. The power tool according to claim 5, wherein:

said motor comprises a pneumatic motor, said power supply means comprises an air supply passage extending through said handle, and said power transferring means comprises a first air communication port located on said tubular portion of said handle and a second air communication port located on said cylindrical surface of said housing, and said first air communications port extends in the longitudinal direction of said housing to ensure air communication from said handle to said housing irrespective of a relative position between said handle and said housing.

8. The power tool according to claim 5, wherein said cylindrical surface of said housing and said tubular portion of said handle have circular cross sections.

9. The power tool according to claim 8, wherein said cylindrical surface of said housing is provided with an axial groove, and a wedge element supported on said tubular portion of said handle engages said groove for maintaining relative angular positions of said handle and said housing during longitudinal adjustment of said handle.

10. The power tool according to claim 8, wherein said tubular portion of said handle is formed with a slot extending in the longitudinal direction of said housing, and said housing is provided with a threaded bore for receiving a lock screw extending through said slot.

* * * * *